US009489025B2

(12) United States Patent
Dai et al.

(10) Patent No.: US 9,489,025 B2
(45) Date of Patent: Nov. 8, 2016

(54) I/O CONTROL SYSTEMS AND METHODS

(75) Inventors: Fangyong Dai, Tomball, TX (US);
Adnan A. Siddiquie, Houston, TX (US); Riley B. Norman, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 756 days.

(21) Appl. No.: 13/387,147

(22) PCT Filed: Jan. 22, 2010

(86) PCT No.: PCT/US2010/021855
§ 371 (c)(1),
(2), (4) Date: Jan. 26, 2012

(87) PCT Pub. No.: WO2011/090486
PCT Pub. Date: Jul. 28, 2011

(65) Prior Publication Data
US 2012/0131256 A1 May 24, 2012

(51) Int. Cl.
*H05K 7/10* (2006.01)
*G06F 13/00* (2006.01)
*G06F 1/26* (2006.01)
*G06F 1/32* (2006.01)

(52) U.S. Cl.
CPC .......... *G06F 1/266* (2013.01); *G06F 1/3203* (2013.01); *G06F 1/3253* (2013.01); *Y02B 60/1235* (2013.01)

(58) Field of Classification Search
CPC ..... G06F 1/266; G06F 1/3203; G06F 1/3253
USPC ................................ 710/302, 316; 713/300
See application file for complete search history.

(56) References Cited

U.S. PATENT DOCUMENTS

| 3,568,076 | A | * | 3/1971 | Thornhill | 327/234 |
| 3,593,036 | A | * | 7/1971 | Ma et al. | 327/385 |
| 3,613,020 | A | * | 10/1971 | McBride | 330/1 A |
| 3,619,619 | A | * | 11/1971 | Skurla | 250/203.1 |
| 3,677,635 | A | * | 7/1972 | Van Auken et al. | 399/90 |
| 3,701,142 | A | * | 10/1972 | Cannara | 341/167 |
| 4,959,649 | A | * | 9/1990 | Akano | 340/870.42 |
| 4,970,623 | A | * | 11/1990 | Pintar | 361/187 |
| 5,008,771 | A | * | 4/1991 | Palara | 361/103 |
| 5,754,870 | A | * | 5/1998 | Pollard et al. | 713/323 |
| 5,796,965 | A |   | 8/1998 | Choi et al. |  |
| 5,911,079 | A | * | 6/1999 | Yang et al. | 713/300 |

(Continued)

FOREIGN PATENT DOCUMENTS

KR    10-2007-0026963    3/2007

OTHER PUBLICATIONS

International Searching Authority, International Search Report and Written Opinion, Appln. No. PCT/US2010/021855, date of mailing Oct. 22, 2010, 8 p.

*Primary Examiner* — Faisal M Zaman
(74) *Attorney, Agent, or Firm* — Trop, Pruner & Hu, P.C.

(57) ABSTRACT

An input/output ("I/O") port control system is provided. The system can include an I/O controller (110) comprising a power input (115) and an operably connected I/O interface (120). A power supply (150) and switch (130) can be operably connected to the power input. A detector (140) can be operably connected to the I/O interface and to the switch. The detector can be adapted to close the switch when an electrical circuit is completed through the I/O interface.

19 Claims, 3 Drawing Sheets

(56) References Cited

U.S. PATENT DOCUMENTS

| | | |
|---|---|---|
| 6,401,157 B1 * | 6/2002 | Nguyen et al. ............... 710/302 |
| 6,467,042 B1 | 10/2002 | Wright et al. |
| 7,210,619 B2 | 5/2007 | Wurzburg |
| 7,936,543 B2 * | 5/2011 | Restrepo et al. ............... 361/42 |
| 2004/0230733 A1 | 11/2004 | Yan |
| 2005/0033890 A1 * | 2/2005 | Lee ............................... 710/302 |
| 2005/0162017 A1 * | 7/2005 | Chin et al. ..................... 307/44 |
| 2005/0174126 A1 * | 8/2005 | Piesinger ...................... 324/539 |
| 2007/0260358 A1 * | 11/2007 | Katoh ............................ 700/286 |
| 2008/0270809 A1 | 10/2008 | Hoffer et al. |
| 2009/0055666 A1 | 2/2009 | Yee |
| 2009/0144460 A1 | 6/2009 | Lin et al. |
| 2009/0161396 A1 * | 6/2009 | Lin et al. ...................... 363/125 |
| 2010/0011133 A1 | 1/2010 | Takano |

* cited by examiner

I/O CONTROL SYSTEMS AND METHODS

BACKGROUND OF THE INVENTION

Description of the Related Art

The energy efficiency of electronic devices continues to improve to meet the three-fold requirements of public demand, industry standards, and government legislation. Many electronic devices are equipped with input and output ports to facilitate consumer attachment of peripheral devices. The addition of input and output ports is not without cost however, as frequently the electronic device must maintain a minimal power flow to the input and output ports, even when unused, simply to facilitate the "hot attachment" of a peripheral device by the consumer. This minimal power flow to every onboard input and output port can adversely affect battery life in portable devices, and to jeopardize the ability of the manufacturer of the electronic device to meet public demand, industry standards, and governmental legislation.

BRIEF DESCRIPTION OF THE DRAWINGS

Advantages of one or more disclosed embodiments may become apparent upon reading the following detailed description and upon reference to the drawings in which.

DETAILED DESCRIPTION

Figure 1:
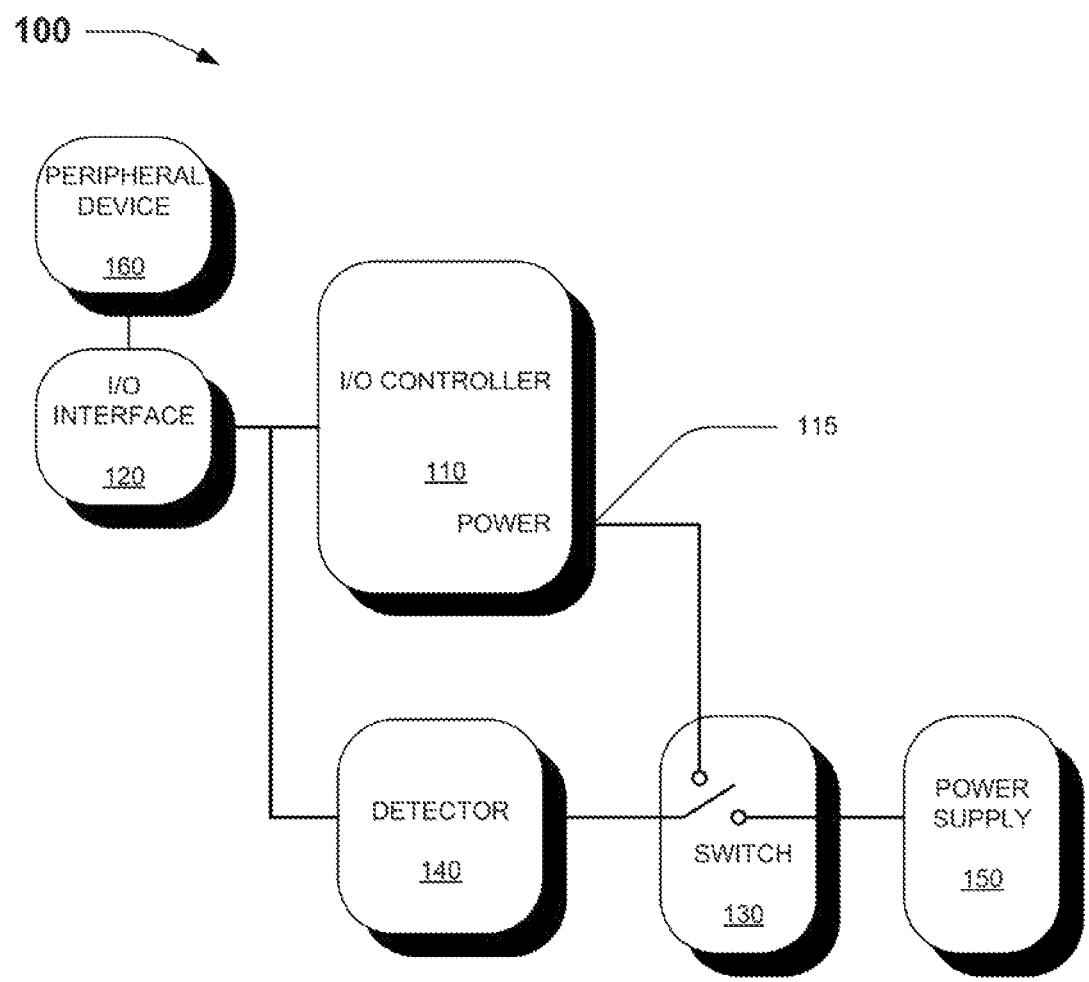
FIG. 1 is a block diagram depicting an illustrative input/output control system, according to one or more embodiments described herein.

Modern electronic devices are frequently equipped with a number of input/output ("I/O") ports to facilitate the attachment of peripheral devices by the consumer. To maintain the I/O ports in a "hot pluggable" state, i.e. a state where the consumer is always able to attach a peripheral device, power is frequently supplied to the I/O controllers and I/O ports even when no peripheral device is attached. The continuous supply of power to unused I/O controllers and ports on an electronic device represents a loss or waste of power responsible for diminishing operating life in battery powered devices, and adversely impacting overall energy efficiency of the electronic device. Installing physical switches on each I/O port to literally "switch off" power flow to the port when a peripheral device is not attached adds complexity to the device and also requires the installation of separate, distinct, components dedicated to switching off the power supplied to the I/O port. The capability to halt the even nominal flow of power to I/O ports can therefore provide a measurable increase in battery life and efficiency of electronic devices where such interruption capability exists.

The ability to use existing components installed in the electric device to control the flow of power to I/O ports carries the inherent advantage of not requiring the installation of additional equipment to interrupt power flow to unused I/O ports. Taking advantage of existing components also minimizes the cost and eliminates the board space required to install additional components dedicated to controlling power flow to I/O ports. The ability to reduce power consumption provides benefits such as increased battery life to the consumer, while allowing electric device manufacturers to meet or exceed industry and/or government energy efficiency standards.

In at least some embodiments, an input/output ("I/O") control system is provided. The system can include an I/O controller comprising a power input and an operably connected I/O interface. A power supply and switch can be operably connected to the power input. A detector can be operably connected to the I/O interface and to the switch. The detector can be adapted to close the switch upon completion of an electrical circuit through the I/O interface.

In at least some embodiments, an input/output (I/O) control method is provided. The method can include monitoring an I/O interface for the operable connection of a peripheral device to the I/O interface. The method can also include detecting the connection of a peripheral device using a detector adapted to provide a first signal when the peripheral device is not operably connected to the I/O interface and a second signal when the peripheral device is operably connected to the I/O interface. The method can include opening the switch operably connected to the detector and a power supply when a first signal is received from the detector. The method can also include closing the switch when a second signal is received from the detector. When the switch is closed, at least a portion of the power from the power supply is transmitted to the I/O controller.

FIG. 1 is a block diagram depicting an illustrative input/output control system 100, according to one or more embodiments. The system 100 can include, among other components, an I/O controller 110, an I/O interface 120, a switch 130, a detector 140, and a power supply 150. In at least some embodiments, a peripheral device 160 can be operably connected to the I/O interface 120. An illustrative operably connected peripheral device 160 to can include a peripheral device such as a photo scanner 160 attached to a personal computer via an Institute of Electrical and Electronics Engineers ("IEEE") 1394 ("Firewire") I/O interface 120.

As used herein, the term "operable connection", or a connection by which entities are "operably connected", can include a connection in which the entities are attached in a manner whereby a first entity is in some way physically attached, connected, or bonded to a second entity. An operable connection can be directly between the first and the second entities, for example through the use of threaded fasteners, nails, chemical adhesives, weldment, or the like. A direct connection between the first and the second entities can be non-detachable, for example through the use of chemical adhesives or weldment, or detachable, for example through the use of removable fasteners such as threaded fasteners or cam-lock connectors. An operable connection can be indirectly between the first and the second entities via one or more intermediate entities, for example a piston can be operatively connected to a crankshaft via a connecting rod, an intermediate entity.

In at least some embodiments, the I/O interface can be communicatively coupled to the I/O controller 110 and the detector 140. The detector 140 can be communicatively coupled to, and control, either alone or in conjunction with one or more additional devices, the switch 130. The switch 130 can be disposed at any point along the power supply circuit suitable for interrupting the flow of power from the power supply 150 to the I/O controller 110. Such locations can include, without limitations, having the switch disposed within, or integral with, the I/O controller 110 or the power supply 150.

As used herein, the term "communicative coupling," or a connection by which entities are "communicatively coupled," is one in which signals, physical communications, and/or logical communications may be sent and/or received. Typically, a communicative coupling includes a physical interface, an electrical interface, and/or a data interface, but it is to be noted that a communicative coupling may include differing combinations of these or other types of connections sufficient to allow intermittent or continuous communication or control. For example, two entities can be communicatively coupled by being able to communicate signals to each other directly or through one or more intermediate entities like a processor, operating system, a logic device, software, or other entity. Logical and/or physical communication channels can be used to create a communicative coupling between entities.

The I/O controller 110 can include any number of devices, systems, or any combination of systems and devices suitable for controlling one or more aspects of the I/O interface 120. Illustrative, non-limiting, examples of a typical I/O controller 110 can include: an Firewire controller, a Universal Serial Bus ("USB") controller, a cardbus controller, a super I/O controller, an HID controller, a Peripheral Component Interconnect ("PCI") controller, an Advanced Technology Attachment ("ATA") controller, a Serial ATA ("SATA") controller, and an External SATA ("eSATA") controller. In at least some embodiments, the I/O controller 110 can include any controller communicatively coupled to a personal computer South Bridge controller. In some embodiments, the switch 130 can be partially or completely disposed in, on, or about the I/O controller 110.

At least one power input 115 can be disposed in, on, or about the I/O controller 110. In some embodiments, the power input 115 can be an independent circuit adapted to supply at least a portion of the power consumed by the I/O controller 110. In some embodiments, where the I/O controller 110 is a board-mount or socket-mount device, all or a portion of the power input 115 can include one or more circuit traces. In some embodiments, the power input 115 can be communicatively coupled to the switch 130 adapted to interrupt the flow of power to the I/O controller power input 115.

The I/O interface 120 can include any number of systems, devices, or any combination of systems and devices suitable for attachment of one or more peripheral devices to the electronic device upon which the I/O interface 120 is disposed. In some embodiments, the I/O interface 120 can be an external interface, e.g., an interface that is user accessible from the exterior of the electronic device upon which the interface is mounted. In some embodiments, the I/O interface 120 can be an internal interface, e.g., an interface that is accessible only after all or a portion of a housing surrounding the electronic device is removed or otherwise displaced. The I/O interface 120 can include serial interface, a parallel interface, or any combination thereof. The I/O Interface 120 can include one or more electrical connectors or contacts, for example, one or more contact pads, pins, prongs, receptacles, or any combination thereof can be disposed equally or unequally about the I/O interface. In some embodiments, the I/O interface 120 can include one or more physical connection devices adapted to operably connect the peripheral device 160 to the I/O interface 120; such physical connection devices can include, for example, threaded fasteners, quick-connect fasteners, magnetic latches, or any combination thereof.

The I/O interface 120 can be communicatively coupled to the I/O controller 110. The communicative coupling linking the I/O interface to the I/O controller can include one or more conduits, circuits, traces, or combinations thereof. In some embodiments, the I/O interface 120 can be disposed in whole or in part on a circuit board disposed within the electronic device, for example an I/O port disposed at least in part on the motherboard of a personal computer.

The I/O interface 120 can be communicatively coupled in whole or in part to the detector 140. In at least some embodiments, at least a portion of the one or more contact pads, pins, prongs, receptacles, or any combination thereof can be disposed equally or unequally about the I/O interface can be communicatively coupled to the detector 140 in such a manner that an electrical circuit is completed between the detector 140 and the peripheral device 160 when the peripheral device 160 is operatively connected in whole or in part to the I/O interface 120.

In at least some embodiments, the detector 140 can be communicatively coupled to the I/O interface 120 such that upon operative coupling of a peripheral device 160 to the I/O interface 120, an electrical circuit is completed. In at least some embodiments, the completion of the electrical circuit can cause the switch 130 to close, thereby commencing the supply of power from the power supply 150 to the I/O controller power input 115. Conversely, an interruption of the electrical circuit between the detector 140 and the peripheral device 160 can, in some embodiments, indicate the loss of operable connectivity with, i.e. the detachment of, the peripheral device 160 with the I/O interface 120. In at least some embodiments, such interruption of the electrical circuit can cause the switch 130 to open, thereby interrupting the supply of power from the power supply 150 to the I/O controller power input 115.

The switch 130 can include any number of systems, devices, or any combination of systems and devices adapted to interrupt the flow of power from the power supply 150 to the I/O controller power input 115. The switch 130 can include one or more mechanical switches, electrical switches, electromechanical switches, or any combination thereof. In at least some embodiments, the switch 130 can include a semiconductor switch, for example a metal-oxide semiconductor field-effect transistor ("MOSFET"). In at least some embodiments, the switch 130 can include a MOSFET mounted on the motherboard of the electronic device, for example a MOSFET mounted on the motherboard of a computing device.

The detector 140 can include any number of systems, devices, or any combination of systems and devices suitable for detecting the completion of an electrical circuit input to the detector. In at least some embodiments, the detector can include at least one electrical device such as a comparator or operational amplifier adapted to detect the operable coupling of a peripheral device 160 to the I/O interface 120. In some embodiments, the detector 140 can include at least one input adapted to receive a voltage generated by a peripheral device 160 upon operably coupling the peripheral device 160 to the I/O interface 120. In some embodiments, the detector 140 can supply a signal, for example a voltage or frequency signal, to the I/O interface 120; upon operable coupling of a peripheral device 160 to the I/O interface 120, at least a portion of the voltage or frequency signal can return to an input disposed in, on, or about the detector 140.

In some embodiments, the detector 140 can include an independent device mounted within the electronic device. In some embodiments, the detector 140 can be a board-mount or socket-mount device disposed at least partially in, on, or about a circuit board disposed at least partially within the electronic device.

The power supply 150 can include any number of systems, devices or any combination of systems and devices suitable for providing at least a portion of the power consumed by the I/O controller 110. In some embodiments, the power supply 150 can include a common power supply that is shared between multiple independent loads, for example a power supply 150 providing power to a plurality of I/O controllers. In some embodiments, the power supply 150 can include one or more inverters to convert an alternating current ("AC") power input into direct current ("DC") power output. In some embodiments, the power supply 150 can include one or more transformers to reduce the voltage of power input to one or more lower voltage power outputs, for example reducing a 120V power input to a 12V, 5V, and 3V power output. In some embodiments, the power supply 150 can include one or more rectifiers adapted to alter the power input waveform to a different power output waveform, for example from a 120V 60 Hertz AC power input to a 19V sawtooth power output.

In some embodiments, the power supply 150 can include one or more power outputs adapted to enter an "idle" or "no power" state when the demand on the power supply is at or near a zero level. Such power supplies can be employed, for example, where ultra-low power states are required when the electronic device is in a "standby" mode where no user interaction is occurring with the electronic device.

The peripheral device 160 can include any number of systems, devices or any combination of systems and devices suitable for operable connection to the I/O interface 120. In some embodiments, the peripheral device 160 can be a self-powered device, i.e. a device that is power independent from the electric device to which it is attached. In some embodiments, the peripheral device 160 can be a device which draws at least a portion of its power from the I/O interface 120.

Figure 2:
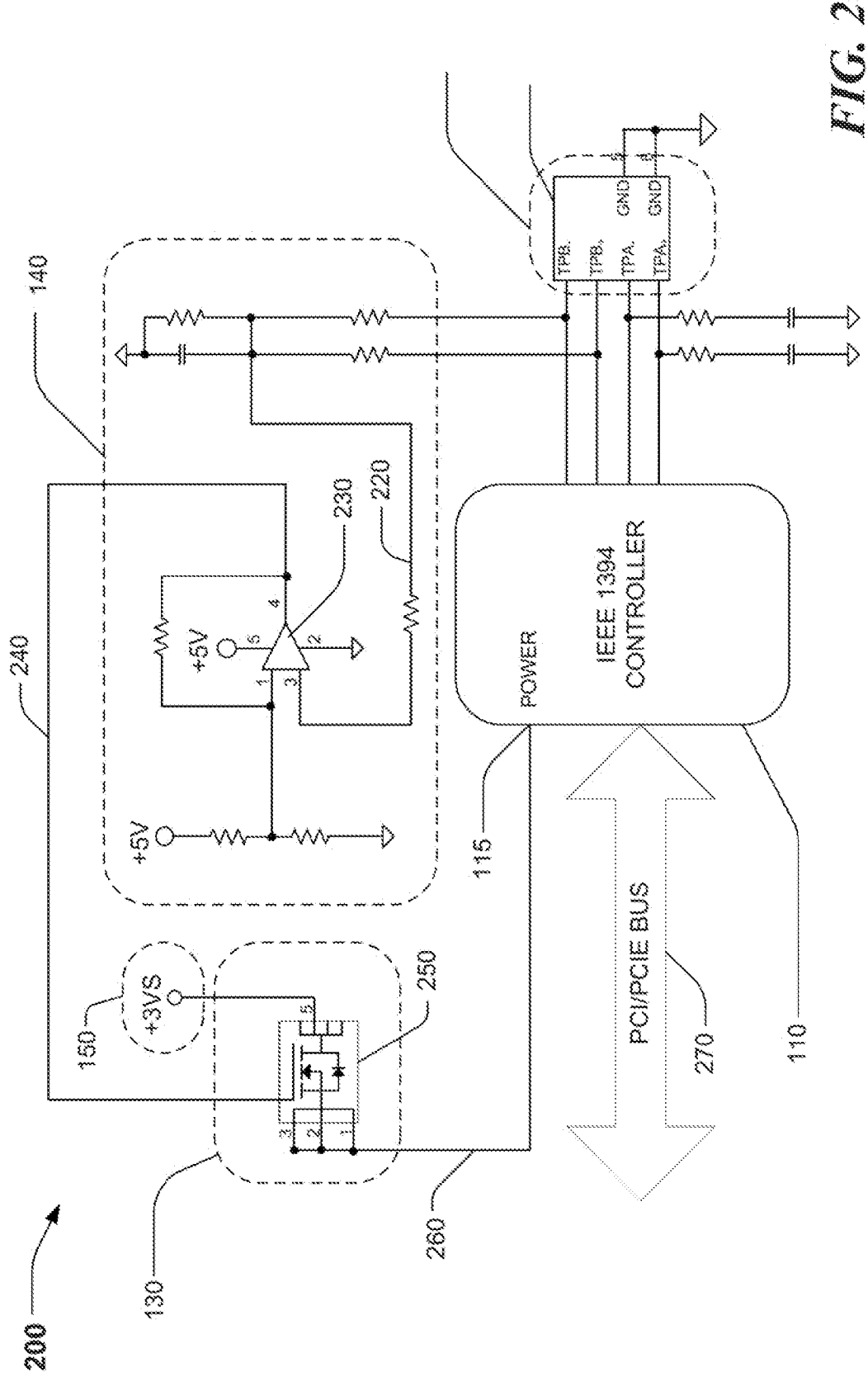
FIG. 2 is a schematic diagram depicting an illustrative embodiment of an I/O control system, according to one or more embodiments described herein.

FIG. 2 is a schematic diagram depicting an illustrative embodiment of an I/O port control system 200, according to one or more embodiments. In at least some embodiments, the system 200 can include an IEEE 1394 ("Firewire") I/O controller 110, communicatively coupled to an I/O interface 120 incorporating at least one IEEE 1394 interface 210. In at least some embodiments, the switch 130 can include one or more MOSFETs 250 operatively coupled to the IEEE 1394 controller power input 115. In at least some embodiments, the detector 140 can include at least one comparator or operational amplifier 230, an input of which can be communicatively coupled 220 to the IEEE 1394 interface 210. In at least some embodiments, a communications bus 270, for example a PCI or PCI Express ("PCIE") bus, can be communicatively coupled to the IEEE 1394 controller.

Although adaptable to any I/O controller 110, I/O interface 120, switch 130, detector 140, and power supply 150, an illustrative example using an IEEE 1394 Firewire controller and interface will be described herein. Those of ordinary skill in the art will readily realize the broad applicability of the method described herein to facilitate similar power management applications on any number, type, or style of I/O controller 110 and interface 120.

In some embodiments, the I/O controller 110 can include an IEEE 1394 Firewire controller, for example the Texas Instruments 128-TQFP-TSB43AB23PDT IC IEEE 1394 controller. In some embodiments, the IEEE 1394 I/O controller 110 can be a board-mounted or socket-mounted integrated circuit device disposed in, on, or about a motherboard disposed at least partially within an electronic device, for example a personal computer. In at least some embodiments, the IEEE 1394 I/O controller can be communicatively coupled to one or more busses, for example a PCI/PCIE bus 270. The IEEE 1394 I/O controller power input 115 can be operably connected 260 to the switch 130.

The I/O interface 120 can, in some embodiments, include an IEEE 1394 interface 210, including either the IEEE 1394 4-wire interface or the IEEE 1394 6-wire interface adapted to provide power from the electronic device to the peripheral device 160 operably connected to the interface. In some embodiments, the IEEE 1394 interface 210 can include a 4-wire interface including TPA+/TPA− (twisted pair A+ and A−) and a TPB+/TPB− (twisted pair B+ and B−) conductors. In some embodiments, the IEEE 1394 interface 210 can include a 6-wire interface, including in addition to TPA+/TPA− and TPB+/TPB−, an unregulated DC power supply conductor and a ground return conductor. In some embodiments, the IEEE 1394 I/O interface 210 can include a 6-wire interface, including in addition to TPA+/TPA−, TPB+/TPB−, the unregulated DC power supply conductor and the ground return conductor, a shield conductor for TPA+/TPA−, and a shield conductor for TPB+/TPB−.

The IEEE 1394 I/O interface 210 can be disposed at any point in, on, or about the electronic device. In some embodiments, when a self-powered peripheral device 160 is operably connected to the IEEE 1394 I/O interface 210, the device can provide an offset voltage on the TPB+/TPB− conductors by driving a TpBias voltage. In at least some embodiments, the detector 140, for example an operational amplifier or comparator 230 as depicted in FIG. 2, can be communicatively coupled 220 to the TPB+/TPB− conductors, and thereby detect the presence of a peripheral device operably connected to the interface.

The detector 140 can include a powered comparator or operational amplifier 230 suitable for detecting the presence of the bias voltage communicated via the conductors 220 when a peripheral device is operably connected to the IEEE 1394 I/O interface 210. When a peripheral device is operably connected to the IEEE 1394 I/O interface 210, the comparator or operational amplifier 230 can transmit an output signal 240 to the switch 130, thereby closing the switch 130 and providing power to the IEEE 1394 controller 110. Conversely, when the peripheral device 160 is detached from the IEEE 1394 I/O interface 210 the bias voltage will fall below a predetermined threshold and the output signal 240 from the comparator or operational amplifier 230 can be interrupted, causing switch 130 to open and power flow to the IEEE 1394 controller 110 to cease.

The switch 130 can include, but is not limited to, a semiconductor device, for example a MOSFET 250 as illustratively depicted in FIG. 2. In some embodiments, the signal 240 provided by the detector 140 can be communicatively coupled to the MOSFET 250. The power supply 150, for example a 3V DC power supply as depicted in FIG. 2, can be operatively coupled to the MOSFET 250. The MOSFET can also be operatively connected 260 to the power input 115 of the IEEE 1394 controller 110. In some embodiments, when the output signal 240 from the powered comparator or operational amplifier 230 is provided to the MOSFET 250, the MOSFET can permit the flow of power from the power supply 250 to the power input 115 of the IEEE 1394 controller 110.

Figure 3:
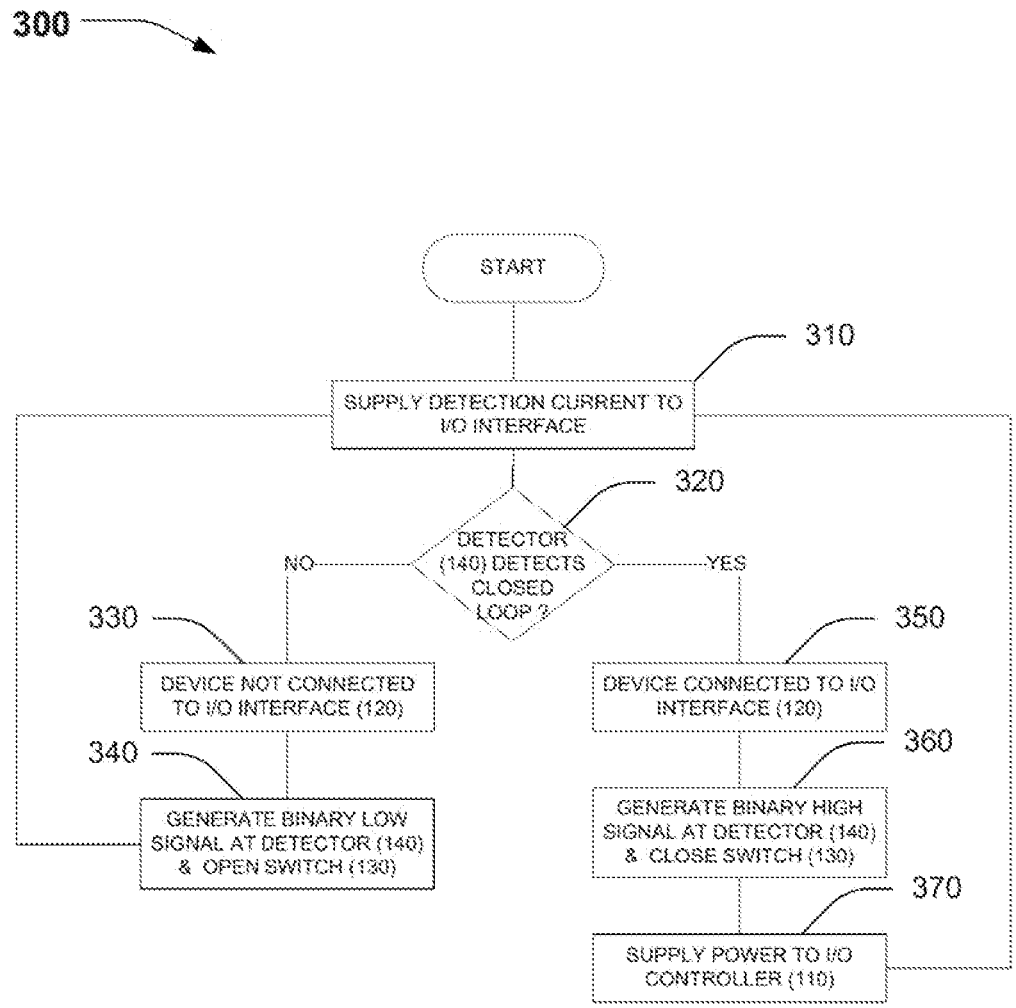
FIG. 3 is a flow diagram depicting an illustrative embodiment of an I/O control method, according to one or more embodiments described herein.

FIG. 3 is a flow diagram depicting an illustrative embodiment of an I/O port control method 300, according to one or more embodiments. In at least some embodiments, the method can include supplying a detection current to the I/O interface 120 in 310. In at least some embodiments, all or a portion of the detection current can be provided by the detector 140.

If no peripheral device 160 is operably connected to the I/O interface 120, an open circuit exists since an electrical circuit cannot be formed through at least a portion of the peripheral device 160. On the other hand, where a peripheral device 160 is operably connected to the I/O interface 120, a closed circuit can be formed through at least a portion of the peripheral device 160.

The method can include detecting the closed loop through at least a portion of the peripheral device 160 in 320. In at least some embodiments, the detector 140 can transmit a signal 240 to the switch 130 in response to the presence or absence of a peripheral device 160 operably connected to the I/O interface 120. For example, in some embodiments, the detector 140 can transmit a first signal when a peripheral device 160 is absent and a second signal when the peripheral device 160 is present.

If a closed loop is not detected through the peripheral device 160 in 320, the detector 140 can determine that a peripheral device 160 is not operably connected to the I/O interface 120 in 330. In at least some embodiments, when a peripheral device 160 is not connected to the I/O interface 120, the detector 140 can output a first signal, for example a binary "low" signal. In response to the first signal, the switch 130 can be opened in 340, thereby interrupting the flow of power from the power supply 150 to the I/O controller 110.

If a closed loop is detected through the peripheral device 160 in 320, the detector 140 can determine that a peripheral device 160 is operably connected to the I/O interface 120 in 350. In at least some embodiments, when a peripheral device 160 is connected to the I/O interface 120, the detector 140 can output a second signal, for example a binary "high" signal. In response to the second signal, the switch 130 can be closed in 360, thereby permitting power to flow from the power supply 150 to the I/O controller 110 in 370.

While the foregoing is directed to embodiments of the present invention, other and further embodiments of the invention may be devised without departing from the basic scope thereof, and the scope thereof is determined by the claims that follow.

What is claimed is:

1. An input/output control system, comprising:
   an I/O controller comprising a power input;
   an I/O interface operably connected to the I/O controller;
   a power supply;
   a switch operably connected between the power supply and the power input such that the I/O controller is between the switch and the I/O interface; and
   a detector operably connected between the I/O interface and the switch, the detector adapted to close the switch to cause power to be supplied from the power supply to the power input of the I/O controller when an electrical circuit is completed through the I/O interface.

2. The system of claim 1, wherein the detector comprises a comparator circuit adapted to output a binary signal to the switch dependent upon the operable connection of a peripheral device to the I/O interface.

3. The system of claim 2, wherein the switch comprises a metal-oxide semiconductor field effect transistor (MOSFET) to close upon an input of a high signal from the detector.

4. The system of claim 1, wherein the I/O interface is selected from the group of interfaces consisting of: an Ethernet interface (RJ45); a modem interface (RJ11); a Firewire interface (IEEE 1394); a display port interface; a media card interface (Secure Digital, Secure, Digital High Density, Compact Flash, and mini-Secure Digital); an express card interface; a Serial ATA interface (SATA); an external SATA interface (eSATA); an audio interface; a serial interface; a Universal Serial Bus (USB) interface; and a video graphics array (VGA) interface.

5. The system of claim 1, further comprising a communications bus communicatively coupled to the I/O controller such that the I/O controller is operably connected between the I/O interface and the bus.

6. The system of claim 5, wherein the communications bus is selected from the group of busses consisting of: a Universal Serial Bus ("USB") bus; a Peripheral Component Interface ("PCI") bus; a Small Computer Serial Interface ("SCSI") bus; an Integrated Drive Electronics ("IDE") bus; a Serial Advanced Technology Adapter ("SATA") bus; an Extended Industry Standard Architecture ("EISA") bus; a Local bus; and a network bus.

7. The system of claim 1,
   wherein the detector comprises a comparator including a first input port to receive a known voltage, a second input port to receive an input indicative of an operable connection of a peripheral device to the I/O interface, and an output port to output a binary low signal when the first input level exceeds the second input level and a binary high signal when the second input level exceeds the first input level;
   wherein the switch is open in the presence of the binary low signal, thereby interrupting the flow of at least a portion of the power from the power supply to the I/O controller; and
   wherein the switch is closed in the presence of the binary high signal, thereby permitting the flow of at least a portion of the power from the power supply to the controller.

8. An input/output (I/O) control method, comprising:
   detecting a connection of a peripheral device using a detector operably connected between an I/O interface and a switch to output a first signal when the peripheral device is not operably connected to the I/O interface and a second signal when the peripheral device is operably connected to the I/O interface;
   closing the switch operably connected between the detector and a power supply and between the power supply and a power input of an I/O controller such that the I/O controller is between the switch and the I/O interface when the second signal is received from the detector to supply power from the power supply to the power input of an I/O controller; and
   opening the switch when the first signal is received from the detector to interrupt supplying of the power from the power supply to the power input of the I/O controller.

9. The method of claim 8, wherein detecting the connection of a peripheral device using the detector comprises:
   supplying a known voltage to a first input of a comparator of the detector;
   supplying a second voltage to a second input of the comparator in response to the connection of the peripheral device to the I/O interface;
   outputting a binary low signal by the comparator when the first input level exceeds the second input level; and
   outputting a binary high signal by the comparator when the second input level exceeds the first input level.

10. The method of claim 8, wherein the switch is selected from the group of switches consisting of: a metal-oxide semiconductor field effect transistor (MOSFET); an electro-mechanical relay; and a solid-state relay.

11. The method of claim 8, wherein the I/O interface is selected from the group of interfaces consisting of: an Ethernet interface (RJ45); a modem interface (RJ11); a Firewire interface (IEEE 1394); a display port interface; a media card interface (Secure Digital, Secure, Digital High Density, Compact Flash, and mini-Secure Digital); an express card interface; a Serial ATA interface (SATA); an external SATA interface (eSATA); an audio interface; a serial interface; a Universal Serial Bus (USB) interface; and a video graphics array (VGA) interface.

12. The method of claim 9, wherein the second voltage is provided at least in part by a circuit formed using at least a portion of at least one circuit disposed within the peripheral device attached to the I/O interface.

13. The method of claim 8, wherein the first signal comprises a binary low signal; and wherein the second signal comprises a binary high signal.

14. The system of claim 1, wherein the switch is connected between the detector and the power input of the I/O controller, and wherein the I/O controller is connected between the I/O interface and a communications bus.

15. The system of claim 1, wherein the I/O controller is selected from the group of controllers consisting of a Firewire controller, a Universal Serial Bus ("USB") controller, a cardbus controller, a super I/O controller, an HID controller, a Peripheral Component Interconnect ("PCI") controller, an Advanced Technology Attachment ("ATA") controller, a Serial ATA ("SATA") controller, and an External SATA ("eSATA") controller.

16. The system of claim 1, wherein the detector is to provide a detection current to the I/O interface.

17. The system of claim 16, wherein the detector is to detect when the electrical circuit is completed through the I/O interface using the detection current.

18. The method of claim 8, wherein detecting the connection of the peripheral device comprises determining whether an electrical circuit is completed through the I/O interface and the peripheral device.

19. The method of claim 18, wherein determining whether the electrical circuit is completed comprises providing a detection current from the detector to the I/O interface.

* * * * *